United States Patent [19]

Matsuda et al.

[11] Patent Number: 5,241,479
[45] Date of Patent: Aug. 31, 1993

[54] SWITCHABLE MODE TRACTION CONTROL METHOD FOR VEHICLE

[75] Inventors: Shohei Matsuda; Toshio Yahagi, both of Saitama; Toshiyuki Azuma, Osaka; Katsutoshi Kizaki, Osaka; Takashi Okuda, Osaka, all of Japan

[73] Assignees: Honda Giken Kogyo Kabushiki Kaisha, Tokyo; NEC Home Electronics, Ltd., Osaka, both of Japan

[21] Appl. No.: 598,308

[22] Filed: Oct. 16, 1990

[30] Foreign Application Priority Data

Oct. 18, 1989 [JP] Japan .................. 1-271268

[51] Int. Cl.⁵ .................. B60T 8/76
[52] U.S. Cl. .................. 364/426.03; 180/197; 303/102; 303/103
[58] Field of Search ............ 364/426.01, 426.02, 364/426.03; 180/197; 303/91, 93, 94, 95, 100, 102, 103

[56] References Cited

U.S. PATENT DOCUMENTS

| | | | |
|---|---|---|---|
| 3,893,535 | 7/1975 | Burkhardt | 180/197 |
| 4,755,945 | 7/1988 | Kade et al. | 364/426.02 |
| 4,759,590 | 7/1988 | Uchida et al. | 364/426.02 X |
| 4,873,638 | 10/1989 | Shiraishi et al. | 364/426.01 |
| 4,939,656 | 7/1990 | Hoashi et al. | 364/426.02 |
| 4,943,922 | 7/1990 | Tanaka | 364/426.02 |
| 4,953,654 | 9/1990 | Imaseki et al. | 180/197 |
| 4,955,448 | 9/1990 | Ise et al. | 180/197 |
| 4,976,329 | 12/1990 | Ise | 180/197 |
| 5,015,041 | 5/1991 | Kuwana et al. | 303/95 |

FOREIGN PATENT DOCUMENTS

| | | |
|---|---|---|
| 0163941 | 12/1985 | European Pat. Off. |
| 0325291 | 7/1989 | European Pat. Off. |
| 87/02948 | 10/1986 | World Int. Prop. O. |

*Primary Examiner*—Thomas G. Black
*Assistant Examiner*—Collin W. Park
*Attorney, Agent, or Firm*—Armstrong, Westerman, Hattori, McLeland & Naughton

[57] ABSTRACT

A traction control method for a vehicle which includes the steps of generating a braking force in drive wheel brake devices when it is determined that a drive wheel shows a slipping tendency, wherein the control mode for left and right drive wheel brake devices is switchable between an independent mode for independently controlling braking forces in the left and right drive wheel brake devices and a collective control mode for collectively controlling braking forces of these brake devices, and controlling the braking forces of the brake devices in the independent control mode in response to a condition in which the absolute value of a difference between left and right drive wheel speeds exceeds a predetermined value.

6 Claims, 4 Drawing Sheets

FIG.4

(a) Drive wheel speed $V_{WL}$ ($V_{WR}$) 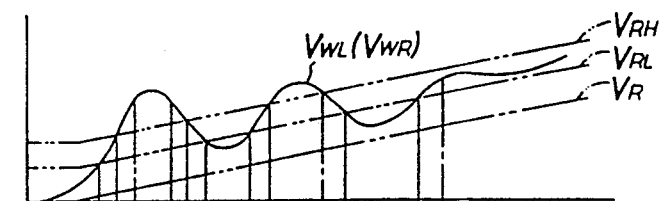

(b) Drive wheel acceleration or deceleration $\alpha_{WL}$ ($\alpha_{WR}$) 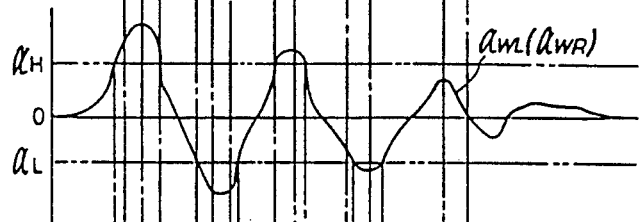

(c) Comparator $23_L$ ($23_R$) 

(d) Comparator $24_L$ ($24_R$) 

(e) Comparator $25_L$ ($25_R$) 

(f) Comparator $26_L$ ($26_R$) 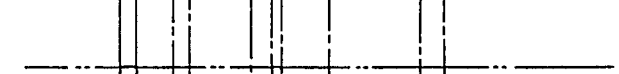

(g) Hydraulic braking pressure control condition — increasing / maintaining / decreasing 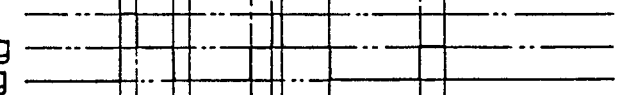

(h) Solenoid $6_S$ 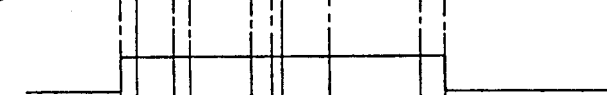

(i) Solenoid $7_S$ 

(j) Solenoid $4_{LFS}$ ($4_{RFS}$) 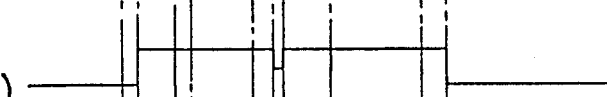

(k) Solenoid $5_{LFS}$ ($5_{RFS}$) 

(l) Braking force 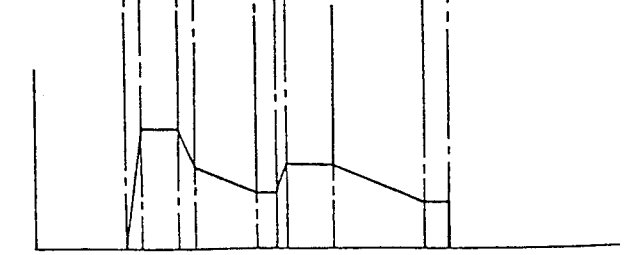

SWITCHABLE MODE TRACTION CONTROL METHOD FOR VEHICLE

BACKGROUND OF THE INVENTION

1. Field of the Invention

The present invention relates to a traction control method for a vehicle, including generating a braking force in drive wheel brake devices when it is determined that a drive wheel in a driven state is in a slipping tendency.

2. Description of Related Art

Such traction control methods are conventionally known, for example, from U.S. Pat. No. 3,893,535.

The above conventional methods include those in which the hydraulic braking pressures of the left and right drive wheel brake devices are independently or collectively controlled when the drive wheel in the driven state begins to have an excessive slipping tendency.

If the left and right drive wheel brake devices are independently controlled, a sufficient driving force can be ensured by a differential limiting effect between both drive wheels, but variations in torque may be produced between the left and right drive wheels to produce a vibration in the vehicle body. On the other hand, if the left and right drive wheel brake devices are collectively controlled, such vibration of the vehicle body may not be produced, but making the driving force insufficient.

SUMMARY OF THE INVENTION

The present invention has been accomplished in order to overcome the above disadvantages, and it is an object of the present invention to provide a traction control method for a vehicle wherein left and right drive wheel brake devices are controlled, while ensuring the harmony of the driving force and stability.

According to a method of the present invention, an independent control mode for independently controlling the braking forces in the left and right drive wheel brake devices and a collective control mode for collectively controlling the braking forces of the left and right drive wheel brake devices can be switched from one mode to the other, so that the braking forces of the left and right drive wheel brake devices are controlled in the independent control mode in response to an absolute value of a difference between left and right drive wheel speeds exceeding a predetermined value.

When the difference between the left and right drive wheel speeds is large due to the slipping tendency of only one of the drive wheels, an appropriate traction control is difficult if the braking forces are controlled in the collective control mode. However, the above method enables the slipping tendency to be quickly eliminated to ensure a proper driving force by conducting the control in the independent control mode, when the difference between the left and right drive wheel speeds is large.

As discussed above, according to the present invention, the independent control mode of independently controlling the braking forces of the left and right drive wheel brake devices and the collective control mode of collectively controlling the braking forces of the left and right drive wheel brake devices can be switched over from one to the other, so that the braking forces of the left and right wheel brake devices are controlled in the independent control mode in response to the absolute value of the deviation between the left and right wheel speeds exceeding the predetermined value. Therefore, when there is a large difference between the left and right drive wheel speeds, it is possible to provide an appropriate traction control to ensure a sufficient driving force of the drive wheel by independently controlling the left and right drive wheel brake devices.

BRIEF DESCRIPTION OF THE DRAWINGS

The drawings illustrate an embodiment of the present invention, wherein

FIG. 4 is a timing diagram.

DETAILED DESCRIPTION OF THE PREFERRED EMBODIMENTS

Figure 1:
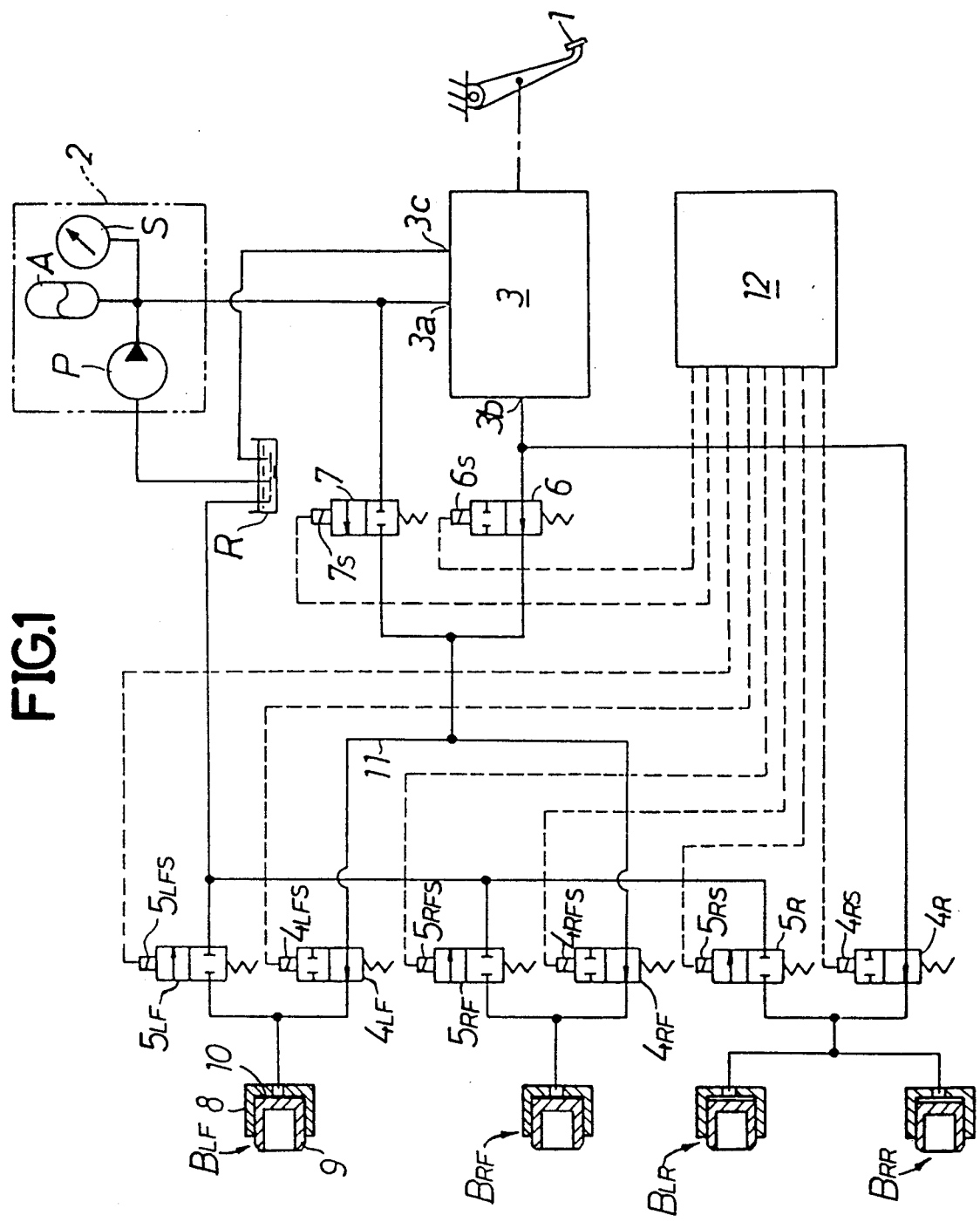
FIG. 1 is a schematic diagram of a hydraulic pressure control circuit of a traction control system.

The present invention will now be described with reference to the accompanying drawings by way of an embodiment in which the present invention is applied to a front engine and front drive vehicle. Referring first to FIG. 1, a left drive wheel brake device $B_{LF}$ and a right drive wheel brake device $B_{LR}$ are mounted on left and right front wheels of the vehicle, respectively, and a left driven or follower wheel brake device $B_{LR}$ and a right driven or follower wheel brake device $B_{RR}$ are mounted on left and right rear wheels, respectively. A hydraulic braking pressure generating means 3 is connected to a brake pedal 1 and capable of controlling the hydraulic pressure from a hydraulic pressure supply source 2 in accordance with the amount of brake pedal 1 depressed to produce a hydraulic pressure. During normal braking, the hydraulic pressure produced by the hydraulic braking pressure generating means 3 is applied to each of the brake devices $B_{LF}$, $B_{RF}$, $B_{LR}$ and $B_{RR}$. The hydraulic braking pressure of the brake devices $B_{LF}$, $B_{RF}$, $B_{LR}$ and $B_{RR}$ can be maintained or reduced to effect an anti-lock control through inlet solenoid valves $4_{LF}$ and $4_{RF}$ and outlet solenoid valves $5_{LF}$ and $5_{RF}$ mounted independently for the drive wheel brake devices $B_{LF}$ and $B_{RF}$ and an inlet solenoid valve $4_R$ and an outlet solenoid valve $5_R$ which are commonly associated with the driven wheel brake devices $B_{LR}$ and $B_{RR}$. In addition, the hydraulic braking pressure of the drive wheel brake devices $B_{LF}$ and $B_{RF}$ can be increased to effect traction control through a traction-controlling normally-opened solenoid valve 6 and normally-closed solenoid valve 7 as well as through the inlet solenoid valves $4_{LF}$ and $4_{RF}$ and the valves $5_{LF}$ and $5_{RF}$.

The hydraulic pressure supply source 2 comprises a hydraulic pump P for pumping working oil from a reservoir R, an accumulator A connected to the hydraulic pump P, and a pressure switch S for controlling the operation of the hydraulic pump P.

The hydraulic braking pressure generating means 3 has an input port $3a$ leading to the hydraulic pressure supply source 2, an output port $3b$, and a release port $3c$ leading to the reservoir R, the means 3 is constructed so that a hydraulic pressure according to the amount of the brake pedal 1 depressed may be delivered from the output port $3b$ by switch-over of communication between the output port $3b$ and the input port $3a$ and communication between the output port 3b and the release port 3c in response to the depression of the brake pedal 1.

Each of the brake devices $B_{LF}$, $B_{RF}$, $B_{LR}$ and $B_{RR}$ comprises a cylinder 8 and a braking piston 9 slidably received in the cylinder 8, and is constructed to exhibit a braking force by movement of the braking piston 9 according to the hydraulic pressure applied to a hydraulic braking pressure chamber 10 defined between the cylinder 8 and the piston 9.

The solenoid valves $4_{LF}$ and $5_{LF}$ are connected in parallel to hydraulic chamber 10 of drive wheel brake device $B_{LF}$. Solenoid valves $4_{RF}$ and $5_{RF}$ are connected in parallel to hydraulic braking pressure chamber 10 in the drive wheel brake device $B_{RF}$. Inlet solenoid valve $4_R$ and the outlet solenoid valve $5_R$ are connected in parallel to the driven wheel brake devices $B_{LR}$ and $B_{RR}$. The inlet solenoid valves $4_{LF}$, $4_{RF}$ and $4_R$ are normally-opened solenoid valves which are closed during excitation of solenoids $4_{LFS}$, $4_{RFS}$ and $4_{RS}$, and the outlet solenoid valves $5_{LF}$, $5_{RF}$, and $5_R$ are normally-closed solenoid valves which are opened during excitation of solenoids $5_{LFS}$, $5_{RFS}$ and $5_{RS}$. Moreover, the inlet solenoid valves $4_{LF}$ and $4_{RF}$ are interposed between the hydraulic braking pressure chambers 10 in the drive wheel brake devices $B_{LF}$ and $B_{RF}$ and oil passage 11, and the outlet solenoid valves $5_{LF}$ and $5_{RF}$ are interposed between the hydraulic braking pressure chambers 10 in the drive wheel brake devices $R_{LF}$ and $B_{RF}$ and the reservoir R. The inlet solenoid valve $4_R$ is interposed between the hydraulic braking pressure chambers 10 in the driven wheel brake devices $B_{LR}$ and $B_{RR}$ and the output 3b of the hydraulic braking pressure generating means 3, and the outlet solenoid valve $5_R$ is interposed between the hydraulic braking pressure chambers 10 in the driven wheel brake devices $B_{LR}$ and $B_{RR}$ and the reservoir R.

The traction-controlling normally-opened solenoid valve 6 is interposed between the oil passage 11 and the output port 3b in the hydraulic braking pressure generating means 3, and the traction-controlling normally-closed solenoid valve 7 is interposed between the oil passage 11 and the hydraulic pressure supply source 2.

The energization and deenergization of the solenoids $4_{LFS}$, $4_{RFS}$, $4_{RS}$, $5_{RFS}$, $5_{RS}$, $6_S$ and $7_S$ in the solenoid valves $4_{LF}$, $4_{RF}$ and $4_R$, $5_{LF}$, $5_{RF}$, $5_R$, 6 and 7 are controlled by a control means 12, and in a normal condition, the solenoids $4_{LFS}$, $4_{RFS}$, $4_{RS}$, $5_{LFS}$, $5_{RFS}$, $5_{RS}$, $6_S$ and $7_S$ are in their deenergized states. In an anti-lock brake control during braking, the inlet solenoid valve $4_{LF}$, $4_{RF}$, $4_R$, corresponding to a wheel which is about to be locked, is brought into a closed state, thereby suppressing a further increasing in the braking force to avoid the wheel lock, but when the wheel is still about to be brought into its locked state, the corresponding outlet solenoid valve $5_{LF}$, $5_{RF}$ and $5_R$ is opened to provide a reduction in braking force, thereby eliminating the locking tendency of the wheel.

When the drive wheel is about to slip excessively, the energization and deenergization of the solenoids $6_S$ and $7_S$ of the traction-controlling normally-opened solenoid valve 6 normally-closed solenoid valve 7 as well as the solenoids $4_{LFS}$ and $4_{RFS}$ in the inlet solenoid valves $4_{LF}$ and $4_{RF}$ and the solenoids $5_{LFS}$ and $5_{RFS}$ in the outlet solenoid valves $5_{LF}$ and $5_{RF}$ are controlled in a switch-over manner by the control means 12, thereby controlling the braking force of the left and right front wheel brake devices $B_{LF}$ and $B_{RF}$ in an increasing or decreasing manner.

When the solenoids $6_S$ and $7_S$ are energized, with the solenoids $4_{LFS}$, $4_{RFS}$, $5_{LFS}$ and $5_{RFS}$ kept deenergized, to close the normally-opened solenoid valve 6 and to open the normally-closed solenoid valve 7, the hydraulic pressure from the hydraulic pressure supply source 2 is applied to the braking hydraulic pressure chambers 10 in the drive wheel brake devices $B_{LF}$ and $B_{RF}$, to rapidly increase the braking force When the solenoids $4_{LFS}$ and $4_{RFS}$ are intermittently energized to intermittently open the outlet solenoid valves $4_{LF}$ and $4_{RF}$ with the solenoids $5_{LFS}$ and $5_{RFS}$ deenergized to close the outlet solenoid valves $5_{LF}$ and $5_{RF}$ in a condition of the normally-opened solenoid valve 6 closed and the normally-closed solenoid valve 7 opened, the hydraulic pressure in the hydraulic braking pressure chambers 10 are slowly increased to slowly increase the braking force of each of the brake devices $B_{LF}$ and $B_{FR}$. When the solenoids $4_{LFS}$ and $4_{RFS}$ are energized and the solenoids $5_{LFS}$ and $5_{RFS}$ are deenergized to close the inlet solenoids valves $4_{LF}$ and $4_{RF}$ and the outlet solenoid valves $5_{LF}$ and $5_{RF}$ with the normally-opened solenoids valve 6 closed and the normally-closed solenoid valve 7 opened, the hydraulic pressure in the hydraulic braking pressure chamber 10 is maintained to keep the braking force of each of the brake devices $B_{LF}$ and $B_{RF}$. Further, when the solenoids $4_{LFS}$ and $4_{RFS}$ are energized to close the inlet solenoid valves $4_{LF}$ and $4_{RF}$ and the solenoids $5_{LFS}$ and $5_{RFS}$ are energized to open the outlet solenoid valves $5_{LF}$ and $5_{RF}$ with the normally-opened solenoid valve 6 closed and the normally-closed solenoid valve 7 opened, the hydraulic pressure in the hydraulic braking pressure chamber 10 can be rapidly released to rapidly decrease the braking force of each of the brake devices $B_{LF}$ and $B_{RF}$. When the solenoids $5_{LFS}$ and $5_{RFS}$ are intermittently energized to intermittently open the outlet solenoid valves $5_{LF}$ and $5_{RF}$ with the solenoids $4_{LFS}$ and $4_{RFS}$ energized to close the inlet solenoid valves $4_{LF}$ and $4_{RF}$ in a condition of the normally-opened solenoid valve 6 being closed and the normally-closed solenoid valve 7 being opened, the hydraulic pressure in the hydraulic braking pressure chamber 10 can be slowly released to slowly decrease the braking force of each of the brake devices $B_{LF}$ and $B_{RF}$.

In other words, in this hydraulic pressure control circuit, a rapid increase mode of rapidly increasing the braking force, a slow increase mode of slowly increasing the braking force, a maintaining mode of maintaining the braking force, a rapid decrease mode of rapidly decreasing the braking force and a slow decrease mode of slowly decreasing, the braking force can be switched over from one to another to control the braking force in the increasing and decreasing manner by controlling the energization and deenergization of the individual solenoids $4_{LFS}$, $4_{RFS}$, $5_{LFS}$, $R_{RFS}$, $6_S$ and $7_S$ in a switchover manner during a traction control operation, as shown in Table 1 (below).

TABLE 1

| CONTROL MODE | SOLENOID | | | | | |
|---|---|---|---|---|---|---|
| | $6_S$ | $7_S$ | $4_{LFS}$ | $4_{RFS}$ | $5_{LFS}$ | $5_{RFS}$ |
| Rapid inc. mode | En | En | De | | De | |
| Slow inc. mode | En | En | Int. En | | De | |
| Ma. mode | En | En | En | | De | |
| Rapid dec. mode | En | En | En | | En | |

TABLE 1-continued

Figure 2:
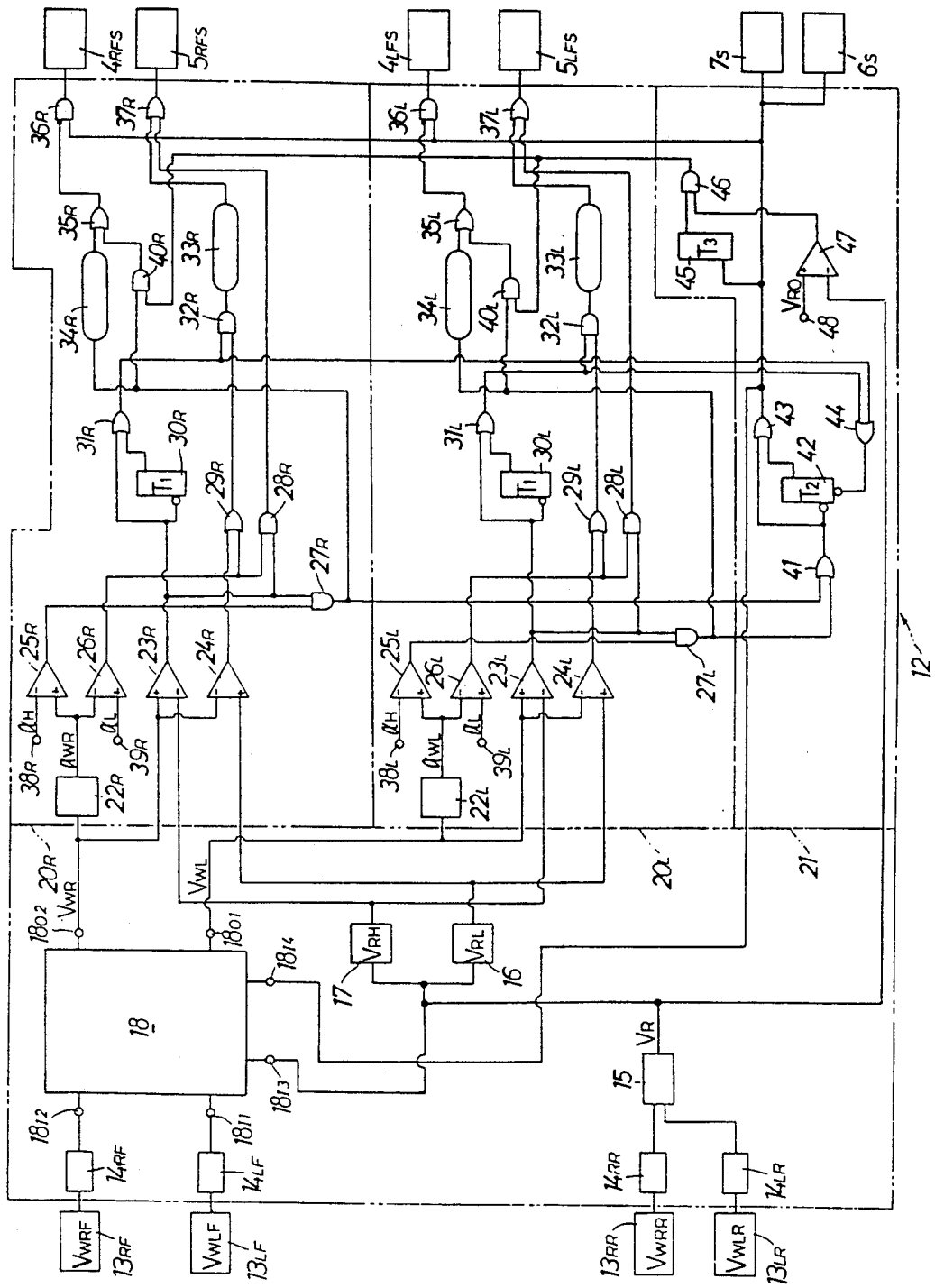
FIG. 2 is a schematic diagram illustrating an arrangement of a section of a control means which is associated with a traction control system of FIG. 1.

| CONTROL MODE | SOLENOID | | | | | |
|---|---|---|---|---|---|---|
| | $6_S$ | $7_S$ | $4_{LFS}$ | $4_{RFS}$ | $5_{LFS}$ | $5_{RFS}$ |
| Slow dec. mode | En | En | | En | | Int. En | inc. = increase
dec. = decrease
Ma. = maintaining
En = Energization
De = Deenergization
Int. En = Intermittent Energization Referring to FIG. 2 illustrating an arrangement of that section of the control means 12 which corresponds to the traction control, wheel speed detectors $13_{LF}$ and $13_{RF}$ for detecting the speeds of the left and right drive wheels, (i.e., the left and right front wheels), and wheel speed detectors $13_{LR}$ and $13_{RR}$ for detecting the speeds of the left and right driven wheels, i.e., the left and right rear wheels) are connected to the control means 12. The control means 12 controls, in a switchover manner, the energization and deenergization of the solenoids $4_{LFS}$ and $4_{RFS}$ of the inlet solenoid valves $4_{LF}$ and $4_{RF}$ and the solenoids $5_{LFS}$ and $5_{RFS}$ of the outlet solenoid valves $5_{LF}$ and $5_{RF}$ associated with the left and right drive wheel brake devices $B_{LF}$ and $B_{RF}$ as well as the solenoid $6_S$ of the traction-controlling normally-opened solenoid valve 6 and the solenoid $7_s$ of the traction-controlling normally-closed solenoid valve 7 by detected values provided in their wheel speed detectors $13_{LF}$, $13_{RF}$, $13_{LR}$ and $13_{RR}$.

The control means 12 comprises filters $14_{LF}$, $14_{RF}$, $14_{LR}$ and $14_{RR}$ independently connected to the wheel speed detectors $13_{LF}$, $13_{RF}$, and $13_{RL}$ and $13_{RR}$, respectively, a high select circuit 15 connected to the filters $14_{LR}$ and $14_{RR}$, a lower reference speed determination circuit 16 and a higher reference speed determination circuit 17 which are connected to the high select circuit 15, a switchover circuit 18 connected to the filters $14_{LF}$ and $14_{RF}$ to switch between an independent control mode for independently controlling the brake forces of the left and right driving wheel brake devices $B_{LF}$ and $B_{RF}$ and a collective control mode for collectively controlling the brake forces of the left and right driving wheel brake devices $B_{LF}$ and $B_{RF}$, a left front wheel braking-force control section $20_L$ connected to the switchover circuit 18 as well as the lower and higher reference speed determination circuits 16 and 17 in correspondence to the solenoids $4_{LFS}$ and $5_{LFS}$, a right front wheel braking-force control section $20_R$ connected to the switchover circuit 18 as well as the lower and higher reference speed determination circuits 16 and 17 in correspondence to the solenoids $4_{RFS}$ and $5_{RFS}$, and a common control section 21 commonly connected to the left and right front wheel braking force control sections $20_L$ and $20_R$ and connected to the solenoids $6_s$ and $7_s$.

Left and right driven wheel speeds $V_{WLR}$ and $V_{WRR}$ detected by the left and right driven wheel speed detectors $13_{LR}$ and $13_{RR}$ are cleared of noises in the filters $14_{LR}$ and $14_{RR}$ and applied to the high select circuit 15. The high select circuit 15 selects a higher one of the left and right driven wheel speeds $V_{WLR}$ and $V_{WRR}$ as a vehicle speed $V_R$. The vehicle speed $V_R$ obtained in the high select circuit 15 is delivered to the lower and higher reference speed determination circuits 16 and 17. A lower reference speed $V_{RL}$ is obtained at the circuit 16 as shown in FIG. 4(a) from the vehicle speed $V_R$ in accordance with an acceptable slip rate of the driving wheels, and the higher reference speed determination circuit 17 determines a higher reference speed $V_{RR}$ as shown in FIG. 4(a) from the vehicle speed $V_R$ on the basis of the decision that the drive wheels are slipping excessively.

Left and right drive wheel speeds $V_{WLF}$ and $V_{WRF}$ detected by the left and right drive wheel speed detectors $13_{LF}$ and $13_{RF}$ are cleared of noises in the filters $14_{LF}$ and $14_{RF}$ and applied to the switchover circuit 18. The switchover circuit 18 determines which of the independent control mode and the collective control mode for the left and right driving wheel brake devices $B_{LF}$ and $B_{RF}$ is to be used on the basis of the vehicle speed $V_R$ supplied from the high select circuit 15 and the signal supplied from the common control section 21. When it has selected the independent control code, it delivers the left and right drive wheel speeds $V_{WRF}$ and $V_{WRF}$ independently to the left and right front wheel braking-force control sections $20_L$ and $20_R$ and when it has selected the collective control mode, it delivers an average value of the left and right driving wheel speed $V_{WLF}$ and $V_{WRF}$ to both the left and right front wheel brakingforce control sections $20_L$ and $20_R$. The arrangement of the switchover circuit will be described in detail below with reference to FIG. 3.

The left and right front wheel braking-force control sections $20_L$ and $20_R$ have the same construction and hence, components of the left front wheel braking force control section $20_L$ will be described below using reference characters with a suffix L attached thereto, and components of the right front wheel braking force control section $20_R$ corresponding to those of the left front wheel braking force control section $20_L$ are only shown using reference characters with a suffix R attached thereto.

The left front wheel braking force control section $20_L$ comprises a differentiating circuit $22_L$ for differentiating the left drive wheel speed $V_{WLF}$ supplied from the switchover circuit 18 to calculate a driving wheel acceleration or deceleration $\alpha_{WL}$, four comparators $23_L$, $24_L$, $25_L$ and $26_L$, AND circuits $27_L$, $28_L$, $32_L$, $36_L$ and $40_L$, OR circuits $29_L$, $31_L$, $35_L$ and $37_L$, a timer $30_L$, and oscillator circuits $33_L$ and $34_L$.

In the comparator $23_L$, the drive wheel speed $V_{WL}$ is delivered from the switchover circuit 18 to a non-inverted input terminal of the comparator $23_L$, and the higher reference speed $V_{RH}$ is delivered from the higher reference speed determination circuit 17 to an inverted input terminal of the comparator $23_L$. Thus, if $V_{WL} > V_{RH}$, then a high level signal is produced from the comparator $23_L$. In the comparator $24_L$, the lower reference speed $V_{RL}$ is delivered from the lower reference speed determination circuit 16 to a non-inverted input terminal of the comparator $24_L$, and the driving wheel speed $V_{WL}$ is delivered from the switchover circuit 18 to an inverted input terminal of the comparator $24_L$. Thus, a high level signal is produced from the comparator $24_L$ when $V_{RL} > V_{WL}$. In the comparator $25_L$, a drive wheel acceleration or deceleration $\alpha_{WL}$ is delivered from the differentiating circuit $22_L$ to a non-inverted input terminal of comparator $25_L$, and a given reference acceleration $\alpha_H$ is delivered from a reference terminal $38_L$ to an inverted input terminal of the comparator $25_L$. Thus, a high level signal is produced from the comparator $25_L$ when $\alpha_{WL} > \alpha_H$. Further, in the comparator $26_L$, a given reference deceleration $\alpha_L$ is delivered from a reference terminal $39_L$ to a non-inverted input terminal of the comparator $26_L$, and the drive wheel acceleration or deceleration $\alpha_{WL}$ is delivered from the differentiating circuit $22_L$ to an inverted input terminal of the comparator $26_L$. Thus, when $\alpha_L > \alpha_{WL}$, a high level signal is produced from the comparator $26_L$.

Output signals from the comparators $23_L$ and $25_L$ are applied to the AND circuit $27_L$. Thus, the AND circuit $27_L$ produces a high level signal when $V_{WL} > V_{RH}$ and $\alpha_{WL} > \alpha_H$. This signal indicates that the left drive wheel is in an excessive slipping tendency. Output signals from the comparators $23_L$ and $26_L$ are applied to the AND circuit $28_L$. Thus, the AND circuit $28_L$ produces a high level signal when $V_{WL} > V_{RH}$ and $\alpha_L > \alpha_{WL}$. Further, output signals from the comparators $24_L$ and $26_L$ are input to the OR circuit $29_L$ which produces a high level signal when $V_{RL} > V_{WL}$ or $\alpha_L > \alpha_{WL}$.

The timer $30_L$ produces a high level signal which is sustained for a given time $T_1$ from a time point when the high level signal is input thereto. An output signal from the comparator $23_L$ is supplied in an inverted manner to the timer $30_L$. Further, the output signal from the timer $30_L$ is supplied to one of input terminals of the OR circuit $31_L$, and the output signal from the comparator $23_L$ is supplied to the other input terminal of the OR circuit $31_L$. Thus, when the output from the comparator $23_L$ is of a higher level, i.e., $V_{WL} > V_{RH}$, or when the output from the comparator $23_L$ has become a lower level, i.e., the relation $V_{WL} > V_{RH}$ has been established, the OR circuit $31_L$ produces a higher level signal in course of the given time $T_1$ elapsed from a time point when the output from the comparator $23_L$ becomes a low level.

The output signals from the OR circuits $29_L$ and $31_L$ are supplied to the AND circuit $32_L$. Thus, when both of the outputs from the OR circuits $29_L$ and $31_L$ are of a higher level, i.e., when $V_{RL} > V_{WL}$, or when $\alpha_L > \alpha_{WL}$ and $V_{WL} > V_{RR}$, or when $V_{WL} \leq V_{RH}$, the AND circuit $32_L$ produces a higher level signal in course of the given time $T_1$ elapsed therefrom.

The output signal from the AND circuit $32_L$ is applied to the oscillator circuit $33_L$. The oscillator circuit $33_L$ produces an oscillation signal alternately repeating high and low level states, in response to the high level signal inputted thereto from the AND circuit $32_L$. The signal from the oscillator circuit $33_L$ is supplied to one of input terminals of the OR circuit $37_L$. The output signal from the AND circuit $28_L$ is supplied to the other input terminal of the OR circuit $37_L$. Thus, the OR circuit $37_L$ produces a signal which becomes a high level in response to the high level signal produced from the AND circuit $28_L$ when $V_{WL} > V_{RH}$ and $> \alpha_L > \alpha_{WL}$ and which is also of a high level in a high level state of an oscillation signal produced from the oscillator circuit $33_L$, when the output from the AND circuit $28_L$ is of a low level, i.e., when $V_{WL} \leq V_{RH}$ or $\alpha_L \leq \alpha_{WL}$. An output terminal of the OR circuit $37_L$ is connected to the solenoid $5_{LFS}$.

The output signal from the AND circuit $27_L$ is supplied to the oscillator circuit $34_L$. The oscillator circuit $34_L$ produces an oscillation signal alternately repeating high and low level states, in response to the higher level signal supplied thereto from the AND circuit $27_L$, i.e., when $V_{WL} > V_{RH}$ and $\alpha_{WL} > \alpha_H$. This signal from the oscillator circuit $34_L$ is applied to one of input terminals of the OR circuit $35_L$. An output signal from the OR circuit $35_L$ is invertedly supplied to one of input terminals of the AND circuit $36_L$ whose output terminal is connected to the solenoid $4_{LFS}$.

The output signal from the AND circuit $27_L$ is supplied to one of input terminals of the AND circuit $40_L$, and an output signal from the AND circuit $40_L$ is supplied to the other input terminal of the OR circuit $35_L$.

The common control section 21 comprises OR circuits 41, 43 and 44, timers 42 and 45, and AND circuit 46 an a comparator 47.

Output signals from the AND circuits $27_L$ and $27_R$ in the left and right wheel braking-force control sections $20_L$ and $20_R$ are supplied to the OR circuit 41. When at least one of the AND circuits $27_L$ and $27_R$ produces a high level signal, i.e., when the driving wheel is in an excessive slipping tendency and $V_{WL} > V_{RH}$, $\alpha_{WL} > \alpha_H$, $V_{WR} > V_{RH}$, $\alpha_{WR} > \alpha_H$ are established in at least one off the left and right front wheel braking-force control sections $20_L$ and $20_R$, the OR circuit 41 produces a high level signal.

The output signal from the OR circuit 41 is supplied to the timer 42 in an inverted manner and to one of input terminals of the OR circuit 43. The timer 42 produces a high level signal which is sustained for a given time $T_2$, when a higher level signal is applied thereto, i.e., in response to the falling of the output signal from the OR circuit 41. The output signal from the timer 42 is applied to the other input terminal of the OR circuit 43. Thus, when at least one of the left and right drive wheels shows an excessive slipping tendency, the OR circuit 43 produces a high level signal up to lapse of the given time $T_2$ from the elimination of such excessively slipping tendency. An output terminal of the OR circuit 43 is connected to the solenoids $6_s$ and $7_s$.

The output signals from the OR circuits $31_L$ and $31_R$ in the left and right front wheel braking-force control sections $20_L$ and $20_R$ are applied to the OR circuit 44, and an output signal from the OR circuit 44 is invertedly applied to a reset input terminal of the timer 42. Thus, the timer 42 is reset when both of the output signals from the OR circuits $31_L$ and $31_R$ become a low level.

It should be noted that the output signal from the OR circuit 43 is also applied to the other input terminals of the AND circuits $36_L$ and $36_R$ in the left and right front wheel braking-force control sections $20_L$ and $20_R$. When the output signals from the OR circuits $35_L$ and $35_R$ are at a low level and the output signal from the OR circuit 43 is at a high level, the AND circuits $36_L$ and $36_R$ produce high level signals, thereby energizing the solenoids $4_{LFS}$ and $4_{RFS}$.

In addition, the output signal from the OR circuit 43 is also applied to the timer 45 which produces a high level signal that is sustained for a given time $T_3$ after a high level signal has been applied thereto. The output signal from the timer 45 is applied to one of input terminals of the AND circuit 46. An output signal from the comparator 47 is applied to the other terminal of the AND circuit 46. A reference signal corresponding to a reference vehicle speed $V_{RO}$, e.g., 15 to 20 km/hr is supplied from a reference terminal 48 to a non-inverted input terminal of the comparator 47, and a vehicle speed $V_R$ is supplied from the high select circuit 15 to an inverted input terminal of the comparator 47. When the vehicle speed $V_R$ is equal to or less than the reference vehicle speed $V_{RO}$, the comparator 47 produces a high level signal. Thus, when the vehicle speed $V_R$ is less than or equal to the reference vehicle speed $V_{RO}$, the AND circuit 46 produces a high level signal in course of the given time $T_3$ elapsed from a time point when the output from the OR circuit 41 becomes a high level, i.e., when at least one of the left and right driving wheels begins to have an excessive slipping tendency.

The output signal from the AND circuit 46 is applied to the other input terminals of the AND circuits $40_L$ and $40_R$ in the left and right front wheel braking-force control sections $20_L$ and $20_R$. Thus, the AND circuits $40_L$ and $40_R$ produce higher level signals, when the vehicle speed $V_R$ is equal to or less than the reference vehicle speed $V_{RO}$ and the left and right drive wheels are still in the excessive slipping tendency, in course of the given time $T_3$ elapsed after at least one of the left and right drive wheels becomes an excessive slipping tendency.

The given time $T_1$ in the timers $30_L$ and $30_R$, the given time $T_2$ in the timer 42 and the given time $T_3$ in the timer 45 are set as follows:

(a) The given time $T_2$ is set in correspondence to a normal time within which the excessive slipping of the driving wheel can be eliminated. For example, the given time $T_2$ is 1,000 m sec. The given timer $T_2$ is a time for keeping the solenoids $6_s$ and $7_s$ of the traction-controlling normally-opened and normally-closed solenoid valves 6 and 7 energized to permit a traction control responsive to occurrence of the subsequent excessive slipping after the elimination of the excessive slipping tendency of the drive wheel.

(b) The given time $T_1$ is shorter than the given time $T_2$ and is set, for example, at 500 m sec. If the solenoids $6_s$ and $7_s$ are kept energized for a relatively long time $T_2$ (1,000 m sec.) to accommodate the subsequent excessive slipping as described above, the accommodation is impossible when an accelerator is rapidly returned within such time $T_2$ to rapidly reduce the drive wheel speeds $V_{WLF}$ and $V_{WRF}$ down to the vehicle speed $V_R$, or when braking is conducted. The period of time from a point when the left and right driving wheel speed $V_{WLF}$ and $V_{WRF}$ become less than or equal to the higher reference speed $V_{RH}(V_{WLF} \leq V_{RH}$ and $V_{WR} \leq V_{RH})$ to a point when the drive wheel subsequently begins to have the excessive slipping tendency is substantially constant and hence, the given time $T_1$ is set at a sufficient level to cover such period of time. Moreover, the OR circuits $30_L$ and $30_R$ have their outputs each assuming a low level after lapse of the time $T_1$ from a point when $V_{WL} \leq V_{RH}$ and $V_{WR} \leq V_{RH}$. When both the outputs from the OR circuit $30_L$ and $30_R$ become the lower level, the timer 42 is reset. When at least one of the left and right driving wheels is in a relation $V_{WL} > V_{RH}$ or $V_{WR} > V_{RH}$, the timer 42 is not reset, and the solenoids $6_s$ and $7_s$ are kept energized. Therefore, the given time $T_1$ can be set at a relatively short level. Allowing for the above, the given time $T_1$ is set, for example, at 500 m sec.

(c) The given time $T_3$ is set, for example, at 60 m sec. The given time $T_3$ is set as a time required to increase the hydraulic pressure in the hydraulic braking pressure chambers 10 in the left and right drive wheel brake devices $B_{LF}$ and $B_{RF}$ from the atmospheric pressure to a level at which the braking force acts. Here, the timer 45 is operated after an excessive slipping tendency occurs in either one of the left and right driving wheels. For the given time $T_3$, for example, 60 m sec is set a time sufficient to increase the hydraulic pressure in the hydraulic braking pressure chamber 10 in each brake device $B_{LF}$, $B_{RF}$ from the atmospheric pressure to a level at which the braking force acts, when the left and right drive wheels concurrently produce the excessive slipping tendency as well as even when they produce the excessive slipping tendency out of phase.

Figure 3:
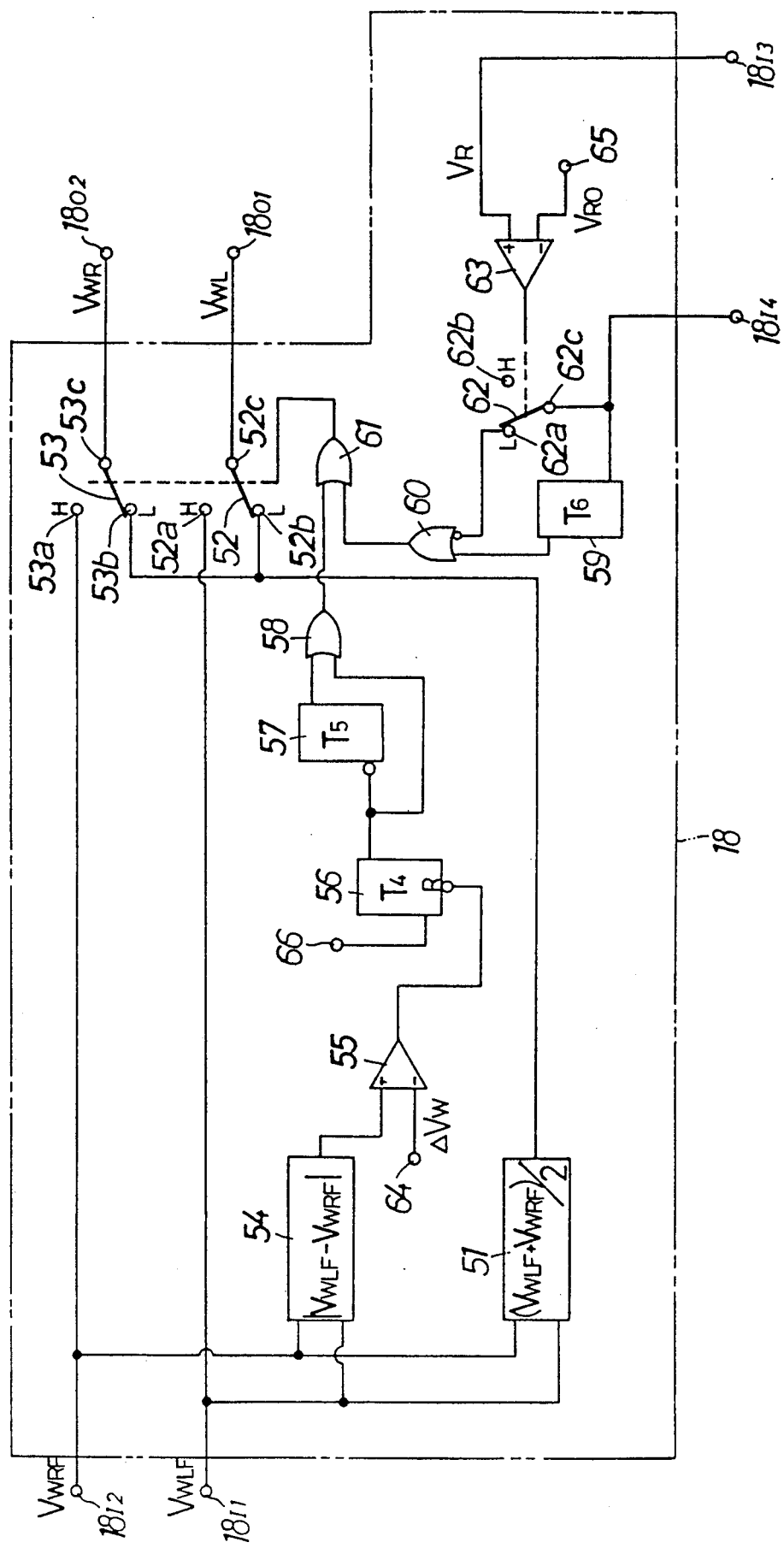
FIG. 3 is a circuit diagram illustrating an arrangement of a switchover circuit in the control means of FIG. 2.

Referring to FIG. 3, the switchover circuit 18 includes an input terminal $18_{I1}$ connected to the filter $14_{LF}$, and input terminal $18_{I2}$ connected to the filter $14_{RF}$, an input terminal $18_{I3}$ connected to the high select circuit 15, an input terminal $18_{I4}$ connected to the OR circuit 43 in the common control section 21, and output terminals $18_{O1}$ and $18_{O2}$ connected separately to the left and right front wheel braking-force control sections $20_L$ and $20_R$. The switchover circuit 18 comprises an average value calculating circuit 51, change-over switches 52, 53, 62, a deviation absolute value calculating circuit 54, comparators 55 and 63, timers 56, 57 and 59, and OR circuits 58, 60 and 61.

The change-over switch 52 comprises a separate contact 52a connected to the input terminal $18_{I1}$ a separate contact 52b connected to the average value calculating circuit 51, and a common contact 52c connected to the output terminal $18_{e1}$. The change-over switch 53 also includes a separate contact 53a connected to the input terminal $18_{I2}$ a separate contact 53b connected to the average value calculating circuit 51, and a common contact 53c connected to the output terminal $18_{O2}$. These change-over switches 52 and 53 change their switching modes in accordance with the output from the OR circuit 61. When the output from the OR circuit 61 is at a high level, the separate contacts 52a and 53a are electrically connected with the common contacts 52c and 53c. When the output from the OR circuit 61 assumes a low level, the separate contacts 52b and 53b are electrically connected to the common contacts 52c and 53c. The average value calculating circuit 51 calculates an average value of the drive wheel speeds by dividing the sum of the drive wheel speeds $V_{WLF}$ and $V_{WRF}$ supplied thereto from the input terminals $18_{I1}$ and $18_{I2}$ by 2. When the output from the OR circuit 61 is at the high level, the independence control mode is established wherein each drive wheel speed $V_{WLF}$, $V_{WRF}$ is delivered as a drive wheel speed $V_{WL}$, $V_{WR}$ from the output terminal $18_{O1}$, $18_{O2}$. When the output from the OR circuit 61 is at the low level, the collective control mode is established wherein the average value of the drive wheel speeds $V_{WLF}$, $V_{WRF}$ is delivered as a drive wheel speed $V_{WR}$ from the output terminal $18_{O1}$, $18_{O2}$.

The deviation absolute value calculating circuit 54 calculates an absolute value ($|V_{WLF} - V_{WRF}|$) of a deviation between the drive wheel speeds $V_{WLF}$ and $V_{WRF}$ supplied thereto from the input terminals $18_{I1}$ and $18_{I2}$ and an output from the deviation absolute value calculating circuit 54 is applied to a noninverted input terminal of the comparator 55. A signal corresponding to a reference deviation $\Delta V_W$, e.g., 4 to 5 km/hr is supplied from a reference terminal 64 to an inverted input terminal of the comparator 55. When the deviation absolute value $|V_{WLF} - V_{WRF}|$ has exceeded the reference deviation $\Delta V_W$ (when $|V_{WLF} - V_{WRF}| > \Delta V_W$), the comparator 55 produces a high level signal.

The timer 56 counts a clock signal normally supplied thereto from a terminal 66 and produces a high level signal when the clock signal has been sustained from a period of time equal to or more than a given time $T_4$ previously determined. When a high level signal has been applied to a reset terminal R, the counting is reset. The output from the comparator 55 is applied in an inverted manner to the reset terminal R and hence, when the high level of the output from the comparator 55 (i.e., $|V_{WLF} - V_{WRF}| > \Delta V_W$) has been sustained for a period of time equal to or more than the given time T4, the high level signal is produced from the timer 56.

The timer 57 produces a high level signal which is sustained for a given time T5 in response to the increasing of an input signal, and the output from the timer 56 is applied in an inverted manner to the timer 57. Therefore, when $|V_{WLF}-V_{WRF}| \leq \Delta V_W$ has been sustained for a period of time greater than or equal to the given time T4, the timer 57 produces the high level signal which is sustained for the given time T5.

The outputs from the timers 56 and 57 are applied to the OR circuit 58. When at least one of the timers 56 and 57 produces a high level signal, i.e., when the relation $|V_{WLF}-V_{WRF}| > \Delta V_W$ has been sustained for the period of time greater than or equal the given time T4, and in course of the given time T5 elapsed from a time point when $|V_{WLF}-V_{WRF}| \leq V_W$ has been established after establishment of $|V_{WLF}-V_{WRF}| > \Delta V_W$, the OR circuit 58 produces a high level signal. The output from the OR circuit 58 is applied to one of input terminals of the OR circuit 61.

On the other hand, the change-over switch 62 changes, in response to the output from the comparator 63, the electrical connections of a separate contact 62a invertedly connected to one of input terminals in the OR circuit 60 and an independent separate contact 62b with a common contact 62c connected to the input terminal $18_{I4}$. When the output from the comparator 63 is of a high level, the separate contact 62b is electrically connected to the common contact 62c, and when the output from the comparator 63 is of a low level, the separate contact 62a is electrically connected to the common contact 62c.

The vehicle speed V is supplied from the input terminal $18_{I3}$ to a non-inverted input terminal of the comparator 63, and a signal corresponding to the reference speed $V_{RO}$, e.g., 15 to 20 km/hr is supplied from a reference terminal 65 to an inverted input terminal of the comparator 63. Thus, if $V_R > V_{RO}$, output from the comparator 63 assures a high level, thereby permitting the input terminal $18_{I4}$ and the OR circuit 60 to be electrically disconnected. If $V_R \leq V_{RO}$ is established, the output from the comparator 63 assumes a low level, thereby permitting the signal applied to the input terminal $18_{I4}$ to be invertedly supplied to the OR circuit 60.

The input terminal $18_{I4}$ is also connected to the timer 59. The timer 59 produces a high level signal which is sustained for a given time T6 after the signal supplied from the input terminal $18_{14}$ has become a high level. The output from the timer 59 is applied to the other input terminal of the OR circuit 60, and further, an output from the OR circuit 60 is applied to the other input terminal of the OR circuit 61.

With such switchover circuit 18, each of the outputs from the OR circuits 60 and 61 is at a high level and hence, the control is of the independent control mode, until the given time T6 is elapsed after the output from the OR circuit 43 in the common control section 21 has become the high level, i.e., after the traction control has been started. In addition, the control is turned to the independent control mode in response to the high level signal produced from the timer 56 when the output from the comparator 55 becomes the high level, i.e., when the condition in which the absolute value $|V_{WLF}-V_{WRF}|$ of the deviation between the left and right drive wheel speeds is larger than the reference deviation $\Delta V_W$ has been sustained for the given time T4. Further, when $|V_{WLF}-V_{WRF}| \leq \Delta V_u$ is established after the condition of $|V_{WLF}-V_{WRF}| > \Delta V_W$ has been sustained for a period of time greater than or equal to the given time T4, the control is in the independent control mode in response to the output of the high level signal which is sustained for the given time T5 from such time point. In other words, when the condition of $|V_{WLF}-V_{WRF}| > \Delta V_W$ has been sustained for the period of time greater than or equal to the given time T4 after lapse of the given time T6 from the start of the traction control, the control is of the independent control mode from the time point when the given time T4 has been elapsed, and the condition of the independent control mode is continued until the given time T5 is elapsed after establishment of $|V_{WLF}-V_{WRF}| \leq \Delta V_W$. In addition, when the vehicle speed $V_R$ is less than or equal to the reference speed $V_{RO}$, the signal applied to the input terminal $18_{I4}$ is at a low level, i.e., the output from the OR circuit 60 is at a high level in a condition in which the drive wheel is not excessively slipping. Therefore, the control is of the independent control mode, wherein the left and right drive wheel speeds $V_{WLF}$ and $V_{WRF}$ as the drive wheel speeds $V_{WL}$ and $V_{WR}$ are delivered from the output terminals $18_{O1}$ and $18_{O2}$.

The given times T4, T5 and T6 in the timers 56, 57 and 59 are set as follows:

(d) The given time T4 is useful to prevent any inadvertent or accidental operation due to the interference of the left and right drive wheels and the variation in drive wheel speed during travelling of the vehicle on a bad road when it is to be decided in the comparator 55 whether or not the $|V_{WLF}-V_{WRF}|$ is larger than $\Delta V_W$. For example, the given time T4 is set at 40 m sec.

(e) The given time T5 is useful to sustain the output signal from the timer 56 until it subsequently becomes the high level to avoid a chattering of a switchover control signal even if the output signal from the timer 56 is changed from the high level to the low level within a relatively short time and for example, the given time T5 is set at 100 to 200 m sec.

(f) The given time T6 corresponds to a time required to apply a necessary braking force when the left and right drive wheels are travelling on road surface portions of different frictional coefficients in order to eliminate the excessive slipping of one of the drive wheels which is in contact with the road surface portions of a lower frictional coefficient. For example, the given time T6 is set at 200 m sec.

The control of the braking force of the left drive wheel brake device $B_{LF}$ in the above construction will be described below with reference to FIG. 4. When the drive wheel speed $V_{WL}$ applied to the left front wheel braking-force control section 20L varies as shown in FIG. 4(a) and the drive wheel acceleration or deceleration $\alpha_{WL}$ varies as shown in FIG. 4(b); the output from the comparator $23_L$ is in FIG. 4(c); the output from the comparator $24_L$ is in FIG. 4(d); the output from the comparator $25_L$ is in FIG. 4(e); and the output from the comparator $26_L$ is in FIG. 4(f), and the control condition of the braking force to be controlled in accordance with such outputs is shown in FIG. 4(g). The energization and deenergization of the solenoids $6_S$ and $7_S$ in accordance with such control condition of the braking force are shown in FIGS. 4(h) and 4(i); the energization and deenergization of the solenoids $4_{LFS}$ and the energization and deenergization of the solenoid $5_{LFS}$ are shown in FIGS. 4(j) and 4(k), respectively; and the braking force of the left drive wheel brake device $B_{LF}$ is shown in FIG. 4(*l*). In FIG. 4, the high level in FIGS. 4(*h*) to 4(*k*) indicates the energization and the low level indicates the deenergization, and further, the intermediate level in FIGS. 4(*j*) and 4(*k*) indicates a condition of the energization and deenergization intermittently changed. The high level of the solenoid $6_s$ in FIG. 4(*h*) indicate closed state of the normally-opened solenoid valve 6, and the high level of the solenoid $7_s$ in FIG. 4(*i*) indicates the opened state of the normally-closed solenoid valve $7_s$. The high level of the solenoid $4_{LFS}$ in FIG. 4(*j*) indicates the closed state of the inlet solenoid valve $4_{LF}$, and the intermediate level thereof indicates the condition where the inlet solenoid valve $4_{LF}$ is opened and closed intermittently. The high level of the solenoid $5_{LFS}$ in FIG. 4(*k*) indicates the closed state of the outlet solenoid valve $5_{LF}$, and the intermediate level thereof indicates the condition where the outlet solenoid valve $5_{LF}$ is intermittently opened and closed.

When the left drive wheel speed $V_{WL}$ has exceeded the higher reference speed $V_{RH}$ and the left drive wheel acceleration or deceleration $\alpha_{WL}$ has exceeded the reference acceleration $\alpha_H$, the outputs from the comparators $23_L$ and $25_L$ assume the high level, and the high level signal is produced from the AND circuit $27_L$ on the basis of the decision that the left drive wheel has become an excessive slipping tendency.

This causes the solenoids $6_s$ and $7_s$ to be energized to close the traction-controlling normally-opened solenoid valve 6 and to open the traction-controlling normally-closed solenoid valve 7. In this case, when the vehicle speed $V_R$ is equal to or less than the reference vehicle speed $V_{RO}$, the output from the AND circuit 46 is at the high level for the given time T3 from the time point of occurrence of the above excessive slipping tendency. When the excessive slipping tendency continues while the output from the AND circuit 46 is at the high level, the output from the AND circuit $4_L$ assumes the high level and thus, the output from the AND circuit $36_L$ assumes the low level, with the solenoid $4_{LFS}$ maintaining a deenergized state. During this time, the outputs from the comparators $24_L$ and $26_L$ are at the low level, and the output from the OR circuit $37_L$ is also at the low level and hence, the solenoid $5_{LFS}$ also maintains a deenergized state. This results in the rapid increase mode, thereby ensuring that the hydraulic pressure from the hydraulic pressure supply source 2 can be rapidly applied to the hydraulic braking pressure chamber 10 in the left drive wheel brake device $B_{LF}$ to rapidly increase the braking force, thereby providing improved responsiveness of the traction control.

Moreover, the output from the timer 45 becomes a low level after a lapse of the given time T3 (e.g., 60 m sec) from a point when the excessive slipping tendency occurs. In response thereto, the output from the AND circuit $40_L$ also becomes a low level, so that the control of the braking force is carried out in the rapid increase mode only for the given time T3 from the point when the drive wheel enters an excessively slipping tendency.

The control of the braking force in the rapid increase mode is performed at an initial stage of the traction control when the vehicle speed $V_R$ is equal to or less than the reference vehicle speed $V_{RO}$ (e.g., 15 to 20 km/hr). This is for the purpose of providing a slow increase in braking force to moderate a vibration of the vehicle body, taking great account of a stability in a higher speed region exceeding the reference vehicle speed $V_{RO}$, because when the left and right drive wheels are independently controlled, there is a possibility that the braking forces of the left and right drive wheel brake devices $B_{LF}$ and $B_{RF}$ may be alternately increased during the traction control to produce a vibration of the vehicle body, if the phases of change in rotational speeds of the left and right drive wheels are displaced. When the control of the engine power output and the control of braking force are used in combination, and if the control of the braking force is prohibited in the rapid increase mode in the higher speed region as described above, the contribution rate of the control of the braking force can be lowered in the higher speed region, i.e., in a region where the engine output is constant at a level more than a predetermined value and the output control is possible, thereby preventing the occurrence of any excessive control and any abnormal behavior of the vehicle.

When the left drive wheel acceleration or deceleration $\alpha_{WL}$ has a relationship $\alpha_H > \alpha_{WL} > \alpha_L$ as a result of the control of the braking force in the rapid increase mode in a condition in which the left drive wheel speed $V_{WL}$ exceeds the higher reference speed $V_{RH}$, the output from the AND circuit $27_L$ becomes a low level. When the right drive wheel is not in the excessively slipping tendency, the output from the OR circuit 41 becomes a low level, but the output from the OR circuit 43 has a high level until the given time T2 lapses by the operation of the timer 42, so that the energization of the solenoids $6_s$ and $7_s$ is sustained. Then, the output from the AND circuit $40_L$ becomes a low level and in response thereto, the output from the OR circuit 36L becomes a high level, thereby energizing the solenoid $4_{LFS}$ to close the inlet solenoid valve $4_{LF}$.

This results in the maintaining mode in which the solenoid $4_{LFS}$ is energized and the solenoid $5_{LFS}$ is deenergized to close the inlet solenoid valve $4_{LF}$ and the outlet solenoid valve $5_{LF}$, so that the hydraulic pressure in the hydraulic braking pressure chamber 10 is maintained to keep the braking force of the brake device $B_{LF}$.

When the left drive wheel speed $V_{WL}$ exceeds the higher reference speed $V_{RH}$, but $\alpha_{WL} < \alpha_L$ as result of the control of the braking force in the maintaining mode, the control of the braking force is carried out in the rapid increase mode. More specifically, the condition in which the left drive wheel speed $V_{WL}$ exceeds the higher reference speed $V_{RH}$ is basically a condition in which a substantial slipping occurs in the drive wheel and intrinsically, braking force should be increased, but such condition can be predicted as a condition in which an excessive braking force overcoming a greater driving force acts from the relationship of $\alpha_{WL} < \alpha_L$. In such condition, the output from the comparator $28_L$ becomes a high level in response to the output from the comparator $26_L$ becoming a high level, and the output from the OR circuit $37_L$ becomes a high level, thereby energizing the solenoid $5_{LFS}$ to open the outlet solenoid valve $5_{LF}$. This permits the hydraulic pressure in the hydraulic braking pressure chamber 10 in the brake device $B_{LF}$ to be rapidly released, so that the braking force is rapidly reduced.

When the drive wheel speed $V_{WL}$ becomes equal to or less than the higher reference speed $V_{RH}$ as a result of the control of the braking force in the rapid decrease mode, the control of the braking force in the slow decrease mode is carried out in a region in which the left drive wheel acceleration or deceleration $\alpha_{WL}$ is less than the reference deceleration $\alpha_L$.

More specifically, in the region in which $V_{RL} < V_{WL} \leq V_{RH}$, in principle, the wheel is in an ideal slipping state and in this case, intrinsically, the braking force should be maintained, but it can be predicted that the relationship of $\alpha_{WL} \leq \alpha_L$ is established because a slightly excessive braking force acts, as compared to the rapid decrease mode. In such region, in response to the output from the comparator $26_L$ becoming a high level, the high level signal from the AND circuit $32_L$ is supplied to the oscillator circuit $33_L$ and in response thereto, high and low level signals from the OR circuit $37_L$ are alternately outputted in a given cycle, thereby intermittently energizing the solenoid $5_{LFS}$. This causes the outlet solenoid valve 5 to be intermittently opened and closed, so that the hydraulic pressure in the hydraulic braking pressure chamber 10 is slowly released, thereby decreasing the braking force of the left drive wheel brake device $B_{LF}$.

Then, when the left and right drive wheel speed $V_{WL}$ becomes equal to or less than the lower reference speed $V_{RL}$, the left drive wheel is brought into an ideal slipping state, i.e, a condition displaced from a target region of the traction control intended to achieve the relationship $V_{RL} < V_{WL} < V_{RH}$. As apparent, it is surmised that an excessive braking force acts in this condition. In this case, the output from the comparator $24_L$ becomes a high level and hence, the solenoid $5_{LFS}$ is intermittently energized in the same manner as described above, whereby intermittent opening and closing of the outlet solenoid valve $5_{LF}$ are continued to sustain a condition in which the braking force of the left drive wheel brake device $B_{LF}$ is slowly decreased.

When $V_{WL} > V_{RL}$ as a result of the above-described slow decrease of the braking force, the output from the comparator $24_L$ becomes a low level and hence, the output from the AND circuit $32_L$ also becomes a low level, so that the solenoid $5_{LFS}$ is deenergized to close the outlet solenoid valve $5_{LF}$, and the control of the braking force is carried out in the maintaining mode.

Moreover, the control of the braking force in the slow decrease mode and in the maintaining mode is ensured by the operation of the timer $30_L$.

When the left drive wheel enters the excessive slipping tendency again, so that the left drive wheel speed $V_{WL}$ exceeds the higher reference speed $V_{RH}$ and at the same time, the left drive acceleration or deceleration $\alpha_{WL}$ exceeds the reference acceleration $\alpha_H$, the control of the braking force is turned to the slow increase mode. More specifically, after a lapse of the given time T3 from the point of initial occurrence of the excessive slipping tendency, the output from the AND circuit 46 becomes a low level and hence, the OR circuit $35_L$ repeatedly produces high and low level signals in a given cycle, so that the solenoid $4_{LFS}$ is intermittently energized to intermittently open and close the inlet solenoid valve $4_{LF}$, thereby permitting hydraulic pressure in the hydraulic braking pressure chamber 10 in the left drive wheel brake device $B_{LF}$ to be slowly increased to slowly increase the braking force.

When the given time T1 (e.g., 500 m sec.) is elapsed after the left drive wheel speed $V_{WL}$ becomes less than or equal to the higher reference speed $V_{RH}$, the timer 42 is reset and hence, when the excessive slipping tendency is eliminated before the given time T2 is elapsed after occurrence of the excessive slipping tendency, the solenoids $6_s$ and $7_s$ are deenergized to open the traction-controlling normally-opened solenoid valve 6 and close the traction-controlling normally-closed solenoid valve 7, ensuring that the hydraulic pressure of both drive wheel brake devices $B_{LF}$ and $B_{RF}$ can be properly controlled in operation of rapidly returning the accelerator or the conducting of the braking operation.

Such a series of controls of the braking force is repeated in accordance with the left drive wheel speed $V_{WL}$ and the left drive wheel acceleration or deceleration $\alpha_{WL}$, thereby eliminating the excessive slipping tendency of the left drive wheel.

At an initial stage of the traction control, the control of the braking force is conducted in the rapid increase mode and when the braking force is subsequently increased, the control of the braking force is conducted in the slow increase mode. Therefore, it is possible to avoid a reactive consumption of the hydraulic braking pressure to provide a good responsive traction control.

Further, when an excessive braking force acts during the traction control, it is necessary to reduce the braking force, wherein the control of the braking force is carried out in the rapid and slow decrease modes switched over from one to another in accordance with the degree of excess. Thus, it is possible to provide an appropriate traction control according to the situation. The above-described control of the braking force is also likewise performed with regard to the right drive wheel.

In the switchover circuit 18 in the control means 12, the control of the braking force is in the independent control mode until the given time T6 is elapsed from the point when the output from the OR circuit 43 in the common control section 21 becomes a high level. That is, the braking forces of the left and right drive wheel brake devices $B_{LF}$ and $B_{RF}$ are controlled respectively on the basis of the left and right drive wheel speed $V_{WLF}$ and $V_{WRF}$. At the start of such a traction control, it is important that the excessive slipping tendency of the drive wheel is eliminated to ensure a sufficient driving force. Because a misalignment of phases of change in rotational speeds of the left and right wheels is difficult to occur, it is possible to ensure a sufficient driving force of the drive wheel by independently controlling the left and right drive wheel brake devices $B_{LF}$ and $B_{RF}$ at least at the start of the traction control. Moreover, when the vehicle speed $V_R$ is equal to or less than the reference speed $V_{RO}$, the switchover circuit 18 is in the independent control mode if the drive wheel is not in an excessive slipping, and the starting of the traction control cannot be delayed.

In addition, when the absolute value $|V_{WLF} - V_{WRF}|$ of the deviation between the left and right drive wheel speeds is larger than the reference deviation $\Delta V_W$, the switchover circuit 18 is turned to the independent control mode in response to such condition sustained for the given time T4 or more. In some cases, only one of the drive wheels may begin to have a slipping tendency to produce a larger deviation between the left and right drive wheel speeds and in such case, the limitation of the excessive slipping tendency is effectively performed by providing the control of the braking forces in the independent control mode.

Further, it is possible to avoid any inadvertent operation due to an interference of the left and right drive wheels and a variation in the drive wheel speed during travelling of the vehicle on a bad road by providing the independent control mode as a result of the condition of the absolute value $|V_{WLF} - V_{WRF}|$ of the deviation between the left and right wheel speeds larger than the reference deviation $\Delta V_W$ being sustained for a period of time greater than or equal to the given time T4. Moreover, when $|V_{WLF}-V_{WRF}| \leq \Delta V_W$ is established after the condition of the $|V_{WLF}-V_{WRF}| > \Delta V_W$ is sustained for the period of time greater than or equal to the given time T4, the independent control mode is sustained only for the given time T5 from such time point. Therefore, it is possible to avoid a chattering of a control signal.

It should be noted that the reference deviation $\Delta V_W$ may be variable so as to be increased as the vehicle speed $V_R$ is increased.

We claim:

1. A traction control method for a vehicle, comprising the steps of:
   generating a braking force in drive wheel brake devices when it is determined that a drive wheel is in a slipping state, wherein left and right drive wheel brake devices are switchable between an independent control mode for independently controlling braking forces in the left and right drive wheel brake devices and a collective control mode for collectively controlling braking forces of the left and right drive wheel brake devices; and
   switching the left and right drive wheel brake devices from the collective control mode to the independent control mode to control the braking forces of the left and right drive wheel brake devices independently of each other in response to a condition in which an absolute value of a difference between respective rotating speeds of left and right drive wheels exceeds a predetermined value.

2. The traction control method of claim 1, further including the step of switching from the collective control mode to the independent control mode in response to continuing of said condition for a period of time greater than or equal to a given time period.

3. The traction control method of claim 2, further including the step of continuing control of the drive wheel brake devices in the independent control mode, when said condition is sustained for the period of time greater than or equal to the given time period, wherein the continuing of control of said brake devices in the independent control mode last only for a predetermined time period from a point in which said absolute value becomes less than or equal to the predetermined value.

4. A traction control method for a vehicle as recited in claim 1, wherein said predetermined value is greater than zero.

5. A traction control method for a vehicle, having an independent control mode for independently controlling braking forces in left and right wheel brake devices, and a collective control mode for collectively controlling braking forces of the left and right drive wheel brake devices, respectively, comprising the steps of:
   sensing respective rotating speeds of left and right drive wheels of a vehicle;
   determining whether a condition exists in which an absolute value of a difference between said respective rotating speeds exceeds a predetermined value; and
   switching the left and right drive wheel brake devices from the collective control mode to the independent control mode to control the braking forces of the left and right drive wheel brake devices independently of each other whenever said condition occurs.

6. A traction control method for a vehicle as recited in claim 5, wherein said predetermined value is greater than zero.

* * * * *